United States Patent Office 2,940,820
Patented June 14, 1960

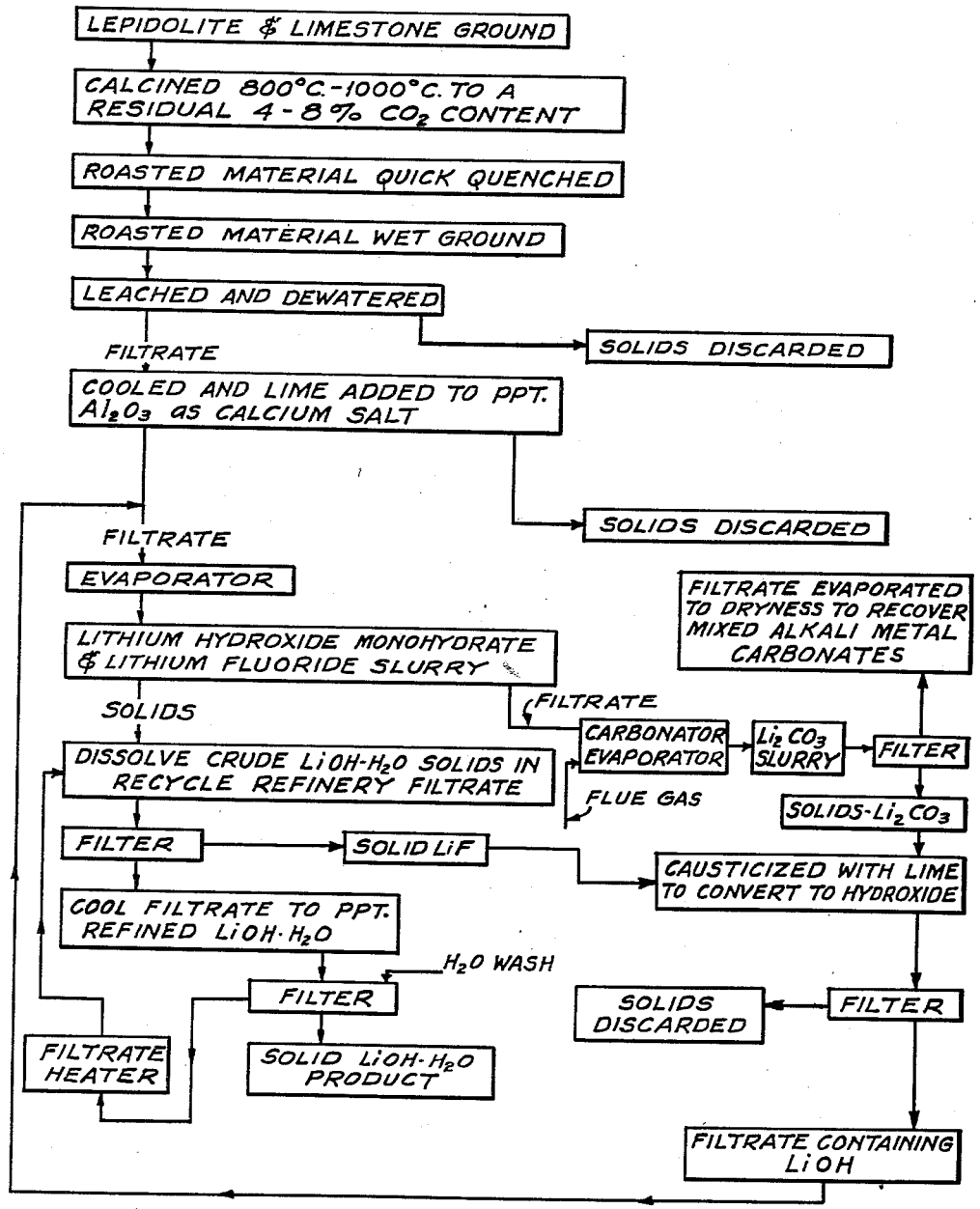

2,940,820
PROCESS FOR RECOVERING ALKALI METAL VALUES FROM LEPIDOLITE

Harold Mazza, Whittier, Stanley L. Cohen, San Diego, and Glen H. Schafer, Trona, Calif., assignors, by mesne assignments, to American Lithium Chemicals, Inc., a corporation of Delaware Filed Mar. 10, 1958, Ser. No. 720,267

6 Claims. (Cl. 23—30)

This invention relates to a process for recovering alkali metal values from lepidolite with the lithium values being recovered principally as the hydroxide monohydrate.

The invention particularly relates to a method of roasting lepidolite with limestone, quenching the roasted material and extracting the roasted material to recover a high percentage of lithium hydroxide as a principal product. A mixture of alkali carbonates, including potassium carbonate, rubidium carbonate, and caesium carbonate can also be recovered.

Although it has previously been proposed to calcine lepidolite with calcium containing materials such as calcium carbonate, it has been believed heretofore that it was necessary to operate under such conditions that substantially all of the calcium carbonate was converted to calcium oxide and that, in fact, calcium oxide could be used as an advantageous starting material instead of calcium carbonate. We have found, however, that such is not the case and that to produce a roasted material having properties enabling one to extract the highest economic amount of lithium, it is necessary to operate under such conditions that a substantial portion of the calcium carbonate is not converted to calcium oxide, but is left undecomposed, mainly in the form of the compound spurrite, which has the formula:

$$4CaO \cdot 2SiO_2 \cdot CaCO_3$$

As much as half the silica will generally be found in the roasted material as spurrite, while essentially all the alumina will be found present in combined form as calcium aluminates.

It is an object of the present invention to provide a process for the roasting of lepidolite with limestone which gives a roasted material from which may be extracted a large amount of lithium in a relatively short time, e.g., one to three hours. This is accomplished by employing an optimum limestone-lepidolite mixture, roasting for such a time and at such a temperature that a substantial content of calcium carbonate is present in the roasted material either as such or in combined form, and quenching the roasted material when the roast has proceeded to the desired extent. We have found it essential to control the roast. Thus as will appear hereinafter under "$CO_2$ Content of the Roasted Material," we have found it essential to roast the material at such a temperature and for such a length of time that the calcium carbonate content of the roasted material, measured as carbon dioxide, is equivalent to from about 4% to about 8% carbon dioxide. When these conditions are observed, then one achieves the optimum lithium extraction.

Another object of this invention is the production of lithium hydroxide monohydrate from such roasted material without going through the stage of forming lithium carbonate, as will be explained hereinafter.

Another object of the invention is to provide a process for recovery of lithium fluoride or lithium carbonate.

Another object is to provide a process for the manufacture of lithium hydroxide monohydrate from lithium fluoride or lithium carbonate.

GENERAL OUTLINE OF PROCESS

In carrying out the present invention, lepidolite may be used as mined or it may be beneficiated to increase the lithium content. A typical ore with which this invention is concerned has the following analysis.

| Component: | Percent |
|---|---|
| $Li_2O$ | 3.74 |
| $K_2O$ | 7.84 |
| $Rb_2O$ | 3.28 |
| $Cs_2O$ | 0.25 |
| $Na_2O$ | 0.41 |
| $SiO_2$ | 52.33 |
| $Al_2O_3$ | 28.06 |
| $Fe_2O_3$ | 0.15 |
| MgO | 0.59 |
| MnO | 0.13 |
| F | 5.56 |
| | 102.34 |
| O=O=  | 2.34 |
| | 100.00 |

In general, the process of the present invention is carried out by first breaking up the raw materials in a jaw crusher. Limestone, lepidolite and water are then mixed together and fed into a ball mill for mixing and grinding to a suitable fineness. The resulting sludge is discharged from the ball mill to a direct fired rotary kiln. In the kiln, the water is evaporated, the limestone is partially decomposed and reacted with lepidolite to form a roasted material containing undecomposed carbonate; as a measure of the roasting, the undecomposed calcium carbonate content of the roasted material is determined as carbon dioxide and the roasting is controlled based on the carbon dioxide content, as is hereinafter explained under "$CO_2$ Content of the Roasted Material." In the roasted material, as much as half the silica is present as spurrite, while essentially all the alumina is present as calcium aluminates.

An important feature of the present invention is that the roasted material is preferably quenched quickly as by dropping it into a tank of cold water or an aqueous quenching medium which is derived from the leaching system, as will be described hereinafter.

The quenched roasted material is wet ground and is thereafter leached in one or more stages. For example, the slurry discharging from the roasted material ball mill is agitated in a primary set of reactors at an elevated temperature, e.g., about 210° F. for an hour. During this period, substantial proportions of lithium and other alkali metals in the ore enter into solution. Although the alkalis enter into solution partly as aluminates, an almost complete conversion to alkali hydroxides occurs during the reaction time specified. The calcium silicate present hydrolyzes to form calcium hydroxide, which then reacts with the aluminates in solution to form an insoluble calcium aluminate and soluble alkali hydroxides. Calcium hydroxide is not or need not be present in the gangue, from which we conclude that the hydrolysis reaction takes place only as long as calcium aluminate is being precipitated.

The slurry from the first leach stage is pumped to a thickener. The solids in the underflow from the first thickener pass, successively, through three more thickeners and a secondary set of reactors. The retention time in this secondary stage is about one hour. The flows in the thickeners and leach tanks are arranged so that partially spent gangue is contacted with progressively weaker liquor. By this means, the solids are washed and an additional quantity of lithia and other alkalis are extracted. All leaching can be accomplished at atmospheric pressure.

The slurry from the secondary leach stage is dewatered on vacuum type gangue filters with the filtrate returning to the leach system. The cake on the filter is discarded after washing with make-up water for the leach system. The overflow from the first thickener is cooled in a heat exchanger and a small amount of lime is added to precipitate any residual alumina and so reduce scaling in the subsequent evaporation of the liquor. The calcium aluminate precipitate is filtered off, then washed, repulped and sent to the gangue filters via the secondary leach step. The alumina-free filtrate is sent back through the heat exchanger where it serves to cool incoming overflow. The hot liquor issuing from the heat exchanger is then sent to a multistage evaporator along with a solution of lithium hydroxide produced by the causticization of by-product lithium carbonate and lithium fluoride. The liquors sent to the evaporator are concentrated until most of the lithia values in solution are precipitated as lithium hydroxide monohydrate, while the other alkali hydroxides remain in solution. The solids removed from the evaporator discharge contain a small amount of lithium fluoride. Consequently, the crude lithium hydroxide monohydrate is dissolved in heated recycling refinery mother liquor, and the lithium fluoride, which is insoluble in the hot liquor, is removed by filtration. The filtered hot pregnant liquor is then cooled and a crop of 99% lithium hydroxide monohydrate is obtained (which analyzes 97%-99% on a dry basis). After removal of the lithium hydroxide monohydrate product, the mother liquor is heated and recycled to dissolve additional crude lithium hydroxide monohydrate.

The lithium fluoride recovered is reacted in an aqueous solution with lime to form a solution of lithium hydroxide and solid calcium fluoride.

The foregoing steps are set forth in diagrammatic form in the drawing which accompanies and forms a part of this specification.

RECOVERY OF RESIDUAL LITHIUM FROM CRUDE LITHIUM HYDROXIDE FILTRATE

To recover the maximum possible amount of soluble lithia, the crude lithium hydroxide monohydrate filtrate is carbonated with carbon dioxide, supplied conveniently as kiln gas, and concentrated. Carbonation and concentration can be conducted simultaneously by use of the submerged combustion technique. One can also carbonate with solid-phase soda-ash, a soda-ash solution or slurry, but we have found direct carbonation much more effective. Lithium carbonate supersaturates in a solution of lithium hydroxide monohydrate treated with soda-ash and equilibrium is not attained, for example, at 60° C. and a 97-hour retention, until the sodium carbonate used is 375% of the quantity required stoichiometrically. Carbonation with carbon dioxide avoids this and is much to be preferred.

The crop of lithium carbonate which forms on carbonation is removed and reacted with lime and water. The calcium carbonate formed during the reaction is filtered from the solution and becomes a part of kiln feed while lithium hydroxide filtrate returns to the evaporators. It may be of interest to note that the two causticizing steps mentioned may be conducted simultaneously in a common vessel.

The lithium carbonate filtrate is then taken to dryness. The tail salts analyze about 70% potassium carbonate, 20% rubidium carbonate, and 10% other alkali carbonates.

The practice of the invention will become further apparent from the following examples of a preferred method of carrying out the process of the present invention.

*Example I.*—Run-of-the-mine lepidolite from Southern Rhodesia was used; its composition was substantially that given heretofore. The limestone used was commercial grade material from San Antonio, Texas. The limestone and lepidolite were first crushed and finely ground. 6,000 grams of the ground limestone and 2,000 grams of the ground lepidolite were then thoroughly mixed with 4,200 grams of water. The resulting sludge was charged into a laboratory scale rotary kiln. The charge was roasted at about 850° C. to incipient fusion. The roasted material remainded in the kiln until somewhat more than 80% of the carbon dioxide in the limestone had been driven off. The hot roasted material discharged from the kiln was immediately quenched and ground in a blending vessel with 15,300 grams of second-stage thickener overflow, described later. It was estimated that about 1,900 grams of water was vaporized from the liquor upon addition of the hot roasted material.

The action of the blending vessel was such that it reduced the roasted material particles to the proper size in about five minutes. After this period of time, the slurry was transferred to another vessel, and agitated for one hour at a temperature close to boiling to simulate the action of a first-stage leach tank. The contents of the agitated vessel were then transferred to a cylinder, settled and thickened, thickening being aided by a miniature Dorr Test Rake mechanism mounted in the cylinder. About 8,200 grams of clear liquor was decanted from the cylinder and the remaining wet gangue (about 11,400 grams) repulped in 15,300 grams of third-stage thickener overflow, described later. The solids were settled, and liquor decanted as before. The solids washing cycle was then repeated two more times, with the wet gangue being repulped in progressively weaker liquor. After the fourth washing cycle (each cycle simulated the action of one thickener), the wet solids were transferred to a vessel and 9,600 grams of weak filtrate added. (Weak filtrate is wash water that has passed through filtered gangue.) The contents of the vessel were agitated at 150° F. for one hour to simulate the action of the second-stage leach tank. The solids were then dewatered on a vacuum Buchner type filter, and the cake washed with approximately 12,000 grams of warm water. The moist gangue, which weighed about 8,550 grams, was discarded.

The clear liquor decanted from the first settling operation was cooled rapidly to a temperature of 104° F. and a milk of lime suspension containing 10 grams of calcium hydroxide added. The slurry was then agitated for three hours at 104° F. As a result of this treatment, the alumina content of the effluent was reduced to a value of less than 0.004%. The lime-alumina solids were then filtered out and the filtrate combined with 750 grams of a 5.7% lithium hydroxide monohydrate solution; this is equivalent to that produced by causticizing the lithium fluoride and carbonate removed in the process. The combined liquors contained about 20 grams of lithium hydroxide monohydrate, and 15 grams of potassium hydroxide per liter of solution. Lesser amounts of other alkali metal hydroxides were also present. The dilute solution was concentrated, by the evaporation of about 8,500 grams of water. The slurry formed by evaporation was cooled to 140° F. and about 160 grams of crude lihtium hydroxide monohydrate solids removed. These solids were repulped in about 2,000 grams of refined lithium hydroxide monohydrate filtrate, from previous runs. The solids and filtrate were then heated to a temperature of 220° F. At this temperature, the solubility of lithium hydroxide monohydrate was such that it dissolved, leaving the insoluble impurities in the crude lithium hydroxide monohydrate as the only solids present. These impurities were filtered out of solution and the hot, clear filtrate cooled to crystallize a crop of refined lithium hydroxide monohydrate. About four grams of impurities (mainly lithium fluoride) were removed by the filtration. The refined crop was removed on a laboratory centrifuge, lightly washed, and spun until the moisture content of the centrifuge cake was less than 3%. The final product weight was 132 grams. The product assayed 96.1% lithium hydroxide monohydrate with water, lithium carbonate, and potassium sulfate being the chief impurities.

Carbon dioxide was injected into the crude lithium hydroxide monohydrate filtrate until all of the hydroxides present in the filtrate had been converted to the carbonates. The carbonated slurry was then concentrated. After 300 grams of water had been evaporated, the lithium carbonate was removed. This crude lithium carbonate weighed about 40 grams. The lithium carbonate filtrate was then taken to dryness, and about 200 grams of salts recovered. The salts were mainly potassium carbonate and rubidium carbonate.

The lithium fluoride and lithium carbonate were treated as follows: A slurry consisting of 1720 grams of water and 45 grams of calcium hydroxide was prepared. The slurry was brought to a boiling temperature and the four grams of lithium fluoride added. After allowing the lithium fluoride to react for about one-half hour, the 40 grams of lithium carbonate were added. The reaction was then allowed to proceed for four hours; at the end of this time, the calcium carbonate and fluoride were filtered out of solution. The clear filtrate remaining corresponded to the 750 grams of 5.7% lithium hydroxide monohydrate solution which was added to the alumina-free leach effluent.

THE $CO_2$ CONTENT OF THE ROASTED MATERIAL

As has been stated above, it has been found that it is necessary to have a substantial calcium carbonate content in the roasted material, the calcium carbonate content being measured as $CO_2$. Thus, if the roasting operation is carried on too long, lithium values are volatilized and the extractability of lithium is substantially reduced. As we have stated above, we have found it essential to roast the material until the calcium carbonate content of the material is equivalent to between 4% and 8% carbon dioxide. If the carbon dioxide content is too high, then the material will not have been roasted sufficiently and the lithium recovery upon extraction is poor; on the other hand, if the carbon dioxide content is too low, then the ore has been over-roasted and the lithium values have either been lost through volatilization or revert to a water-insoluble form. To illustrate, a mixture of limestone and lepidolite in a ratio of three-to-one was roasted in an oven at 925° C. for varying lengths of time and then extracted with water for one hour, to determine the percentage of the total lithium which could be extracted. It was found that when roasted for one and a half hours, over 76% of the lithium could be extracted from the roasted material, while when the same mixture was roasted under the same conditions but for three and a half hours, the extractability decreased to 56%. The $CO_2$ content of the roasted material which had been roasted for one and a half hours was 7.2%, while that that had been roasted for three and one-half hours had dropped to 2.4%. This clearly shows the correlation between the $CO_2$ content and the extractability of the lithium.

Some variation is possible in the composition of the roasted material, depending on the length of time which one desires to extract. In other words, different plant operations will make it economically feasible to extract for different lengths of time and it has been found that the longer the time of extraction, the lower the carbon dioxide content which can be tolerated. Thus, with a two-hour first-stage extraction, the roasted material should contain from 5% to 7% carbon dioxide, while with a three-hour leach, the roasted material can contain as little as 4% or as much as 8% carbon dioxide and still give a satisfactory extraction efficiency. In general, it has been found that the optimum carbon dioxide content of the roasted material is about 6%.

QUICK QUENCHING

To show the effect of quick quenching two lots of roasted material were extracted for one hour. Both lots had been prepared under identical conditions and had $CO_2$ contents of 5.3%; one lot was air cooled while the other lot was quenched quickly by dropping the hot roasted material in water. The air cooled roasted material was extracted in a single-stage to yield 52.8% of the lithium content, while the liquid quenched roasted material yielded 69.1%. These values are indicative of the effect of quick versus slow cooling. Higher recoveries can be achieved in a multistage leaching and recovery system but the same relative relation will still exist between slow versus quick cooling.

THE LIMESTONE-TO-ORE RATIO

The limestone ($CaCO_3$)-to-ore ratio can vary from about 2 to about 4 to 1. With the lower ratios, e.g., between about 2 to 1 and 2.75 to 1, it is essential that the roasted material be quenched immediately. A leach tank effluent free of fluoride can be prepared if a high limestone-to-ore ratio is used, e.g., about 4 to 1. The use of such a high ratio is not necessary since lithium fluoride can be removed during the alumina precipitation step if a sufficiently dilute leach liquor is produced. In general, it is preferred to operate with at least a 2.75 to 1 ratio and the preferred ratio is 3.0 to 1 for a lepidolite ore containing 3% to 4% of lithia, $Li_2O$. The limestone is always present in an amount sufficient to convert all the alumina to calcium aluminates and at least half the silica to spurrite The temperature of the kiln and the roast time can also be varied considerably to the end that the $CO_2$ content of the roasted material is controlled to give an optimum release of the alkali metal values. Thus, one can roast at temperatures from as low as about 800° C. or as high as about 1,000° C. Generally speaking, it is preferred to roast at a temperature of about 900° C. for a period of two hours, under which conditions extraction will be adequate. On the other hand, substantially the same results can be obtained by roasting at 875° C. for a period of three hours. Prolonged roasting at a high temperature results in a low residual $CO_2$ content in the roasted material, loss of alkali metal values by volatilization, and a reduced extractability of these values.

The time-temperature relation is important in that it is determinative of the residual calcium carbonate content in the roasted material which combines with the silica to form spurrite. For example, to ensure a better than 70% extraction of $Li_2O$ from the roasted material with a two-hour, first-stage extraction, it is desirable to hold the roasted material at from 5% to 7% carbon dioxide and with a three-hour, first-stage extraction, the range is from 4% to 8% carbon dioxide.

A shorter kiln retention time is required at the higher temperatures to secure the same residual carbon dioxide content when the limestone-to-ore ratio is high. This is shown by the following:

*Example II.*—Mixtures of ball milled limestone and minus 200-mesh lepidolite ore which contained analyzed 3.74% lithium oxide and 53.4% silica were prepared at limestone-to-ore ratios of 2.75 to 1 and 3 to 1. Portions consisting of 150 grams of these mixtures were roasted at temperatures of 850°, 875° and 900° C. for the 2.75 to 1 make up ratio, and at 875°, 900° and 925° C. for the 3 to 1 ratio; the roast time varied from 1.0 to 4.5 hours. The resulting roasted materials were quick-quenched in liquor containing about 0.5% lithium oxide, and given a first-stage leach with a solution containing about 0.5% lithium oxide. Samples of the leaching slurry were withdrawn after 0.5, 1, 2, 3 and 4 hours' leaching time. The slurry was filtered and the solids given a light wash. The washed solids were analyzed for lithium oxide and the undiluted filtrate for alumina content. The lithium extraction was calculated from the lithium oxide content of the washed gangues and of the original raw mix.

The results are shown in Tables I and II; in Table I, the results obtained with the 2.75 to 1 make up ratio are given while Table II gives the results obtained at a make up ratio of 3 to 1.

*Table I*

EFFECT OF ROASTING CONDITIONS ON LITHIUM EXTRACTION EFFICIENCY OF QUICK-QUENCHED ROASTED MATERIALS FROM LIMESTONE-TO-ORE MAKE-UP RATIO OF 2.75 TO 1

| Roasting Temp., °C. | Roasting Time, Hours | $CO_2$ Content of Roasted Material, Percent | Lithium Extraction, Percent | | | $Al_2O_3$ Content of Leach Liquor, Percent | | |
|---|---|---|---|---|---|---|---|---|
| | | | 1 hr. | 2 hr. | 3 hr. | 1 hr. | 2 hr. | 3 hr. |
| 900 | 1 | 9.3 | | 60.8 | 64.4 | | 0.325 | 0.204 |
| 900 | 1.5 | 7.5 | 66.7 | 71.1 | 71.1 | 0.499 | 0.303 | 0.110 |
| 900 | 2 | 4.6 | 69.7 | 71.8 | 71.1 | 0.360 | 0.133 | 0.043 |
| 900 | 2.5 | 4.2 | 69.2 | 69.9 | 71.3 | 0.339 | 0.113 | 0.042 |
| 875 | 2.5 | 5.4 | 68.4 | 68.4 | 69.1 | 0.400 | 0.157 | 0.052 |
| 875 | 3 | 4.7 | 71.7 | 63.2 | 73.8 | 0.386 | 0.136 | 0.045 |
| 875 | 3.5 | 3.7 | 62.4 | 63.8 | 70.1 | 0.297 | 0.099 | 0.049 |
| 875 | 4 | 3.5 | 61.0 | 60.3 | 64.5 | 0.281 | 0.087 | 0.045 |
| 850 | 2.5 | 7.3 | 63.5 | 62.8 | 62.8 | 0.454 | 0.328 | 0.133 |
| 850 | 3 | 7.2 | 64.5 | 64.5 | 64.5 | 0.480 | 0.288 | 0.109 |
| 850 | 3.5 | 5.8 | 69.9 | 67.8 | 70.6 | 0.406 | 0.195 | 0.067 |
| 850 | 4 | 5.3 | 67.8 | 67.8 | 69.9 | 0.401 | 0.170 | 0.053 |

*Table II*

EFFECT OF ROASTING CONDITIONS ON LITHIUM EXTRACTION EFFICIENCY OF QUICK-QUENCHED ROASTED MATERIALS FROM LIMESTONE-TO-ORE MAKE-UP RATIO OF 3 TO 1

| Roasting Temp., °C. | Roasting Time, Hours | $CO_2$ Content of Roasted Material, Percent | Lithium Extraction, Percent | | | $Al_2O_3$ Content of Leach Liquor, Percent | | |
|---|---|---|---|---|---|---|---|---|
| | | | 1 hr. | 2 hr. | 3 hr. | 1 hr. | 2 hr. | 3 hr. |
| 925 | 1 | 9.5 | 74.0 | 78.6 | 76.3 | 0.34 | 0.261 | 0.141 |
| 925 | 1½ | 5.0 | 76.1 | 76.1 | 79.9 | 0.122 | 0.029 | 0.020 |
| 925 | 2½ | 3.5 | 72.6 | 74.8 | 78.5 | 0.035 | 0.033 | 0.032 |
| 925 | 3½ | 2.4 | 56.4 | 64.5 | 69.7 | 0.031 | 0.042 | 0.043 |
| 900 | 1½ | 8.4 | 75.0 | 77.3 | 72.8 | 0.345 | 0.180 | 0.063 |
| 900 | 2½ | 5.4 | 78.3 | 79.8 | 79.1 | 0.187 | 0.033 | 0.020 |
| 900 | 2½ | 4.2 | 76.3 | 71.1 | 80.7 | 0.064 | 0.030 | 0.026 |
| 900 | 3½ | 2.9 | 60.9 | 67.6 | 69.8 | 0.038 | 0.042 | 0.044 |
| 875 | 2 | 8.9 | 71.0 | 71.7 | 73.2 | 0.385 | 0.204 | 0.098 |
| 875 | 3 | 5.5 | 78.3 | 79.1 | 76.9 | 0.264 | 0.050 | 0.030 |
| 875 | 4 | 3.4 | 68.9 | 71.9 | 76.3 | 0.060 | 0.034 | 0.034 |

Better lithium extractions are obtained at the 3 to 1 make up ratio than at the 2.75 to 1 ratio. The alumina content of the leach effluent is also more acceptable at the 3 to 1 ratio level. With a 2.75 to 1 ratio, the alumina content was not reduced to a satisfactory level in less than 3 hours. At the 3 to 1 ratio, however, the alumina content, at near optimum carbon dioxide levels, lithium-extraction-wise, reach acceptable levels in about two hours, especially at the higher temperatures.

LIMESTONE PURITY

To ensure economical recovery of alkali metal values from lepidolite, it is essential to use as pure a limestone as is available. Unfortunately, most limestones contain acidic components (silica, principally), which react with calcum oxide during the roasting operation and, as a result, less calcium oxide is available for the primary limestone-lepidolite reaction. This difference between limestone and calcium carbonate requirement can be kept to a minimum by the use of a limestone low in silica. As a general rule, however, under the same process conditions, more limestone than pure calcium carbonate is required per unit of ore.

The limestone-ore ratio must be based on the effective or available quantity of calcium carbonate present. Thus, one should correct the actual quantity of limestone and by taking into account the quantities present of magnesium oxide, silica and alumina.

Magnesium carbonate is effective as a substitute for calcium carbonate to a limited extent. Those skilled in the ore roasting art will have no difficulty in selecting a good limestone and in the arriving at the proper quantity of the natural limestone selected.

This is a continuation-in-part of our application, Serial No. 517,064, filed June 21, 1955, now abandoned.

We claim:
1. A process for recovery of lithium values from an ore containing lepidolite comprising calcining a mixture consisting essentially of from about two to about four parts of available calcium carbonate to one of lepidolite at a temperature of from about 800° to about 1000° C. for a time sufficient to provide a roasted material containing calcium carbonate equivalent to from about 4% to about 8% carbon dioxide, quenching the roasted material, grinding and leaching the quenched material to form a slurry containing alkali metal hydroxide and lithium fluoride in solution, separating inert solids from said slurry to provide a solution, concentrating said solution to precipitate lithium hydroxide monohydrate and lithium fluoride, filtering the resulting mixture to separate a solid mixture of solid lithium hydroxide monohydrate and solid lithium fluoride, dissolving the solid lithium hydroxide monohydrate from the solid mixture and filtering the so-formed solution to separate undissolved solid lithium fluoride from the filtrate, and crystallizing a crop of refined lithium hydroxide monohydrate from the last mentioned filtrate.

2. A process for recovery of lithium values from an ore containing lepidolite comprising calcining a mixture consisting essentially of from about two to about four parts of available calcium carbonate to one of lepidolite at a temperature of from about 800° to about 1000° C. for a time sufficient to provide a roasted material containing calcium carbonate equivalent to from about 4% to about 8% carbon dioxide, then quenching said roasted material, grinding and leaching the quenched material to form a slurry containing alkali metal hydroxide and lithium fluoride in solution, removing inert solids from said slurry to provide a solution, evaporating said solution to precipitate lithium hydroxide monohydrate and lithium fluoride, filtering the mixture to provide a filtrate and a mixture of solid lithium hydroxide monohydrate and solid lithium fluoride, carbonating and further concentrating the filtrate to precipitate solid lithium carbonate, dissolving the lithium hydroxide monohydrate from the mixture with lithium fluoride and filtering the so-formed solution to separate undissolved solid lithium fluoride, crystallizing a crop of refined lithium hydroxide monohydrate from the last mentioned solution, and treating the aforementioned lithium fluoride and lithium carbonate solids with lime to produce a lithium hydroxide solution which is returned to the evaporation step.

3. A process for recovery of lithium values from an ore containing lepidolite comprising calcining a mixture consisting essentially of from about two to about four parts of available calcium carbonate to one of lepidolite at a temperature of from about 800° to about 1000° C. for a time sufficient to provide a roasted material containing calcium carbonate equivalent to from about 4% to about 8% carbon dioxide, then quenching the roasted material, grinding and leaching the quenched material to form a slurry containing alkali metal hydroxide values in solution, removing solids from said slurry to provide a solution, evaporating said solution to concentrate the solution and cooling the concentrated solution to precipitate crude lithium hydroxide monohydrate, filtering the cooled solution to remove crude lithium hydroxide monohydrate and provide a filtrate, carbonating and further concentrating the filtrate to precipitate lithium carbonate, causticizing the lithium carbonate with lime to form a lithium hydroxide monohydrate solution, and recovering the lithium hydroxide monohydrate from the last mentioned solution.

4. A process for recovery of lithium values from an ore containing lepidolite comprising calcining a mixture consisting essentially of from about two to about four parts of available calcium carbonate to one of lepidolite at a temperature of from about 800° to about 1000° C. for a time sufficient to provide a roasted material containing calcium carbonate equivalent to from about 4% to about 8% carbon dioxide, quenching the roasted material, grinding and leaching the quenched material to form a slurry containing alkali metal hydroxide values in solution, separating solids from said slurry to provide a solution, cooling and treating said resultant solution with lime to remove alumina, evaporating the lime-treated solution to concentrate the solution and precipitate a mixture of lithium hydroxide monohydrate and lithium fluoride, dissolving crude lithium hydroxide monohydrate from the mixture and filtering the so-formed solution to separate undissolved lithium fluoride, causticizing the undissolved lithium fluoride to form a lithium hydroxide solution, and returning the so-formed lithium hydroxide solution to the evaporation step.

5. A process for recovery of lithium values from an ore containing lepidolite comprising calcining a mixture consisting essentially of from about two to about four parts of available calcium carbonate to one of lepidolite at a temperature of from about 800° to about 1000° C. for a time sufficient to provide a roasted material containing calcium carbonate equivalent to from about 4% to about 8% carbon dioxide, then quenching the roasted material, grinding and leaching the quenched material to form a slurry containing alkali metal hydroxide values and lithium fluoride in solution, removing inert solids from said slurry to provide a solution, cooling and treating the resultant solution with lime to precipitate alumina, evaporating the lime-treated solution to concentrate the solution and cooling the concentrated solution to precipitate a mixture of solid lithium hydroxide monohydrate and lithium fluoride, and dissolving the crude lithium hydroxide monohydrate from the mixture and filtering to separate solid undissolved lithium fluoride.

6. A process for recovery of lithium values from an ore containing lepidolite comprising calcining a mixture consisting essentially of from two to about four parts of available calcium carbonate to one of lepidolite at a temperature of from about 800° to about 1000° C. for a time sufficient to provide a roasted material containing calcium carbonate equivalent to from about 4% to about 8% carbon dioxide, quenching the roasted material, grinding and leaching the quenched material to form a slurry whose liquor contains alkali metal hydroxide values in solution, separating inert solids from said slurry, evaporating the resultant solution to concentrate the solution and cooling the concentrated solution to precipitate crude lithium hydroxide monohydrate, filtering the resultant solution to separate crude lithium hydroxide monohydrate and provide a filtrate containing alkali metal hydroxides in solution, carbonating and further concentrating the filtrate to precipitate lithium carbonate, separating the lithium carbonate from the concentrated liquid, and evaporating the concentrated liquid to dryness to recover other alkali metal values present in said liquid.

References Cited in the file of this patent

UNITED STATES PATENTS

| 2,020,854 | Rosett | Nov. 12, 1935 |
| 2,021,987 | Colton | Nov. 26, 1935 |
| 2,163,466 | Opatowski et al. | June 20, 1939 |
| 2,413,644 | Nicholson | Dec. 13, 1946 |

FOREIGN PATENTS

| 474,159 | Great Britain | Oct. 27, 1937 |